May 20, 1924.
W. W. DEAN
ELECTRIC MOTOR GOVERNOR
Filed June 20, 1919
1,494,416
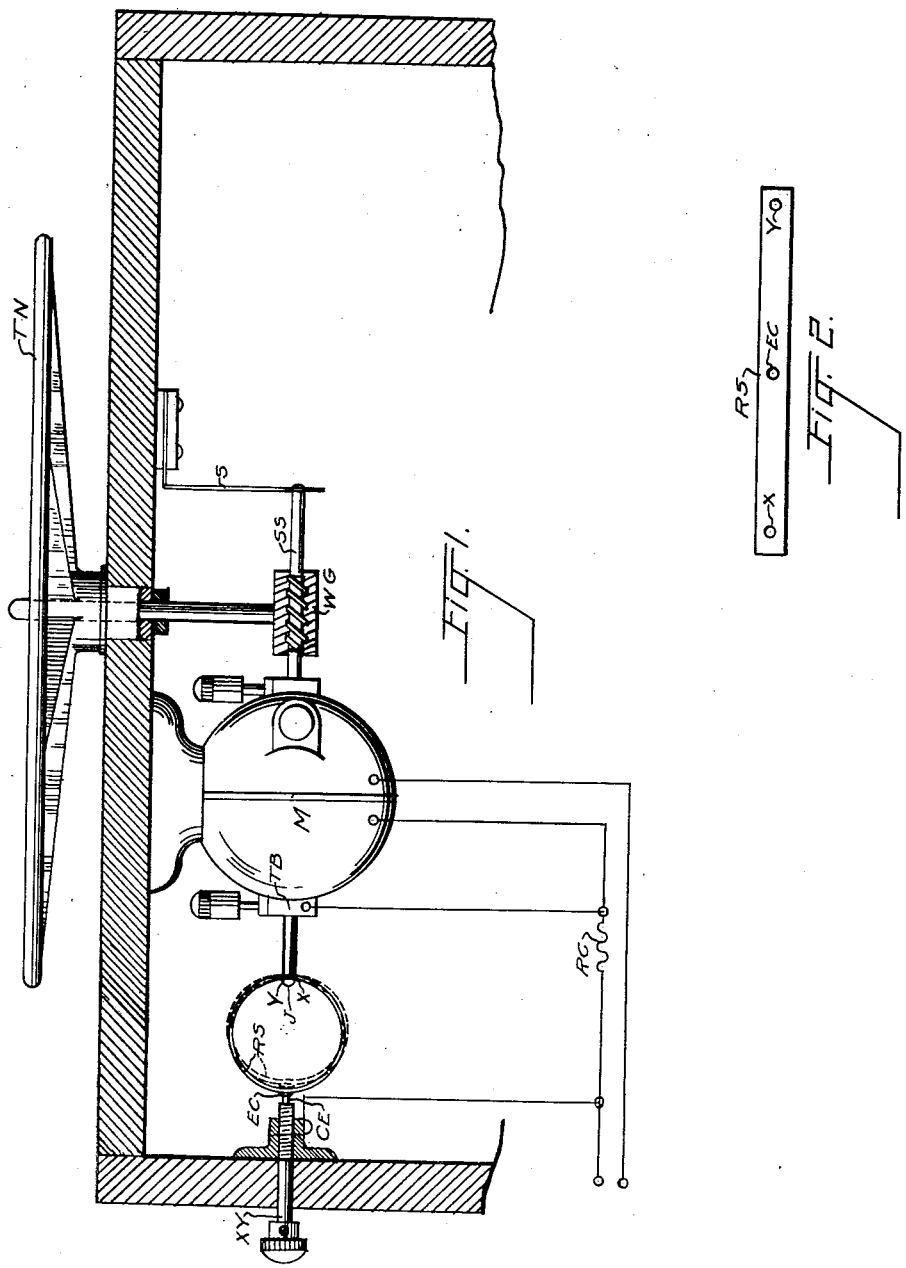

Patented May 20, 1924.

1,494,416

UNITED STATES PATENT OFFICE.

WILLIAM W. DEAN, OF WILMETTE, ILLINOIS, ASSIGNOR TO EFFICIENCY ELECTRIC CORPORATION, OF NEW YORK, N. Y., A CORPORATION OF NEW YORK.

ELECTRIC-MOTOR GOVERNOR.

Application filed June 20, 1919. Serial No. 305,526.

*To all whom it may concern:*

Be it known that I, WILLIAM W. DEAN, a citizen of the United States, residing in Wilmette, in the county of Cook and State of Illinois, have invented certain new and useful Improvements in Electric-Motor Governors; and I do hereby declare the following to be a full, clear, concise, and exact description of the invention, such as will enable those skilled in the art to which it appertains to make and use the same.

My invention relates to electric motor governors, and more particularly to such governing devices as may be used in connection with motors required to be operated at a constant speed as, for instance, phonograph motors and the like, although I may employ the device of my invention wherever such a device finds a use.

It has been previously proposed to control the speed of a motor, such as electric motors, for driving the turn-table of a phonograph, by centrifugally operated electric contacts, the same controlling electric circuits adapted under the control of these centrifugally operated contacts to retard the speed of the motor, so that the motor cannot exceed a given predetermined speed which is substantially that speed required to actuate the centrifugally operated contacts.

Among the previously proposed governor structures are governors in which a centrifugally operated contact, located in line with the axis of rotation of the motor shaft, is operated to control the speed of the motor. My present invention relates to an improved governor of this type. In my present invention I mount the centrifugally operated speed controlling contact at the mid-point of a leaf spring bent into circular form, the two ends of the leaf spring being axially secured to the motor shaft. Although in a preferred embodiment of my invention I use such a governor reed, unweighted, it will be obvious from the following description of my invention that weights may be employed in order to increase the centrifugal effect upon the spring carried motor speed controlling contact.

I prefer, however, to use the reed spring of my invention unweighted, although my invention in its broader aspects is not limited to this preferred arrangement.

It is of prime importance in a device of this kind that the governor reed should not have a tendency to vibrate due to harmonic vibration when the motor is operated, I find that the governor of my invention is much less susceptible to harmonic vibration than other forms of governors that I am familiar with, thus the governing action of the controlling reed contact is of the same nature at all times. It is the prime object of my invention to provide a governor which is free from such harmonic vibrations, and it is a further object of my invention to provide a governor system which has no moving parts restricted in their movement by any form of frictional mechanism.

In many forms of governors employed in this art, defective operation is very often had on account of the variable effect of friction, upon moving elements.

Other objects of my invention and the invention itself will be apparent from the following description of an embodiment thereof, illustrated in the accompanying drawing.

Fig. 1, shows an embodiment of my invention applied to an electric motor shaft and included in a controlling electric circuit for the electric motor, whereby the speed of the motor is regulated. The centrifugally operated contacts of Fig. 1 are of the normally open type, being closed at a predetermined speed.

Fig. 2, shows a plane view of the governor spring illustrated in Fig. 1, the same reference characters being used in both figures to donate like parts.

Referring now to Fig. 1, I show an electric motor driving a turn-table TN of a phonograph, through a worm and gear power transmission mechanism W—G. A spring S, is shown pressing in one direction the motor shaft S, which is understood to have a thrust bearing located at the end of the motor TB to the left thereof, the spring S and the said thrust bearing being provided for the purpose of maintaining a constant longitudinal shaft adjustment, carried on the other end of the shaft and rigidly secured thereto by a machine screw J is a flat leaf spring RS bent in the form of a circle, and having its perforated joined ends X and Y, axially secured to the end of the shaft, by the machine screw J, an electrical contact EC being also axially arranged with reference to the axis of rotation of the motor shaft SS, mounted upon a mid-point of the leaf spring, RS.

The motor may be of any one of various types but I prefer to use a series wound motor, because of the fact that a series wound motor has certain characteristics which are very desirable in a system of this kind. Other types, however, may be used in connection with the governor of my invention.

In the embodiment illustrated I show the governor contact EC and a cooperating stationary contact CE which stationary contact when the motor is at rest, engages the contact EC, the stationary contact CE being mounted upon an adjusting screw XY, may engage the movable contact with varying degrees of pressure depending upon the motor speed desired, these contacts are serially included in the circuit with the operating windings of the motor and when the speed of the motor is in excess of a predetermined speed, the ring-spring RS will take on a more elliptic form such as is illustrated in the drawing of Fig. 1 by dotted lines and the motor energizing circuit in which the controlling contacts are included is momentarily broken, it immediately decreases the motor speed.

This action is continuous, there being frequent openings of the motor energizing circuit at these contacts, and consequent closures.

In order to reduce the electric spark between these contacts, which has the effect of corroding the contact surface, I place a resistance coil RC in shunt circuit by the controlling contacts. This not only prevents an absolute rupturing of the motor energizing circuit, but provides a convenient means of distributing the energy of the inductive discharge when the motor controlling contacts are broken which would otherwise cause an injurious sparking at these contacts.

I am aware that the device of my invention may be used in systems departing quite widely from the system illustrated in Fig. 1, and I am aware that other departures may be made from the embodiment of my invention herein illustrated and described, but what I claim is my invention as defined in the following claims:—

1. In an electric motor governor, the combination with a rotatable motor shaft, having a resilient spring in the form of a loop, said loop being secured at one side to the shaft and having its opposite side disposed in the axis of rotation thereof, an electrical contact element secured to the loop at said axially located point, a stationary contact adapted to normally exert pressure against said contact and to maintain an electrical connection therewith against the resiliency of the spring loop, said loop adapted to be elongated by the power of centrifugal force when the said motor shaft is rotated, such elongation being in a direction at right angles to the axis of rotation, whereby when the said shaft is rotated to a sufficient predetermined speed, the connection between the said contacts will be broken.

2. In combination an electric motor governor mechanism comprising a rotatable shaft, a looped spring, said spring being secured at one end to the shaft and being carried thereby, the opposite end of the spring loop projecting axially of the shaft and carrying an electrical contact element in line with the axis of rotation of the shaft, a stationary contact adapted to make contact with the said spring loop carried contact and to make contact therewith during a given rotational speed range of the motor, and adapted to have said contact broken by the power of centrifugal force elongating the said loop in a direction at right angles to the axis of rotation of the shaft upon a predetermined rate of shaft rotational speed, and an electric circuit controlled by the said contacts.

3. In a governor for controlling the speed of an electric motor, the combination with a rotary shaft adapted to be rotated by the motor, of a spring bent into a closed loop, said loop being secured to the shaft at one portion of the loop and an electric contact element carried at the diametrically opposite point of the loop and in line with the axis of rotation of the shaft, a stationary contact element adapted to make mechanical contact with the said spring loop carried contact, said spring loop being adapted to be elongated in a direction at right angles to the axis of rotation of the said shaft, and to be flattened in the direction of the rotatable shaft axis when the said motor is operated to rotate the said shaft, said deformation of the spring being accomplished solely by the centrifugal force generated by the rotating shaft acting upon the mass on the spring material comprising the loop.

4. In combination an electric motor governing mechanism comprising a rotatable shaft, a flat leaf spring in the form of a closed loop secured at one point of the loop to the said shaft and projecting axially therefrom, said loop carrying at its other end an electric contact disposed in line with the axis of rotation of the said shaft and beyond the end of the shaft, and a stationary electric contact adapted to make contact with the said loop carried contact except when a given predetermined rotational speed of the shaft is exceeded when the said contact will be broken by the power of centrifugal force elongating the loop in a direction at right angles to the axis of rotation of the shaft, such elongation causing a consequent shortening of the loop axis passing through the said loop carried contact, and at right angles to the other said axis.

In witness whereof, I hereunto subscribe my name this 17th day of June, A. D. 1919.

WILLIAM W. DEAN.